United States Patent [19]
Yatomi

[11] Patent Number: 6,141,481
[45] Date of Patent: *Oct. 31, 2000

[54] MODIFYING DATA STORED IN MEMORY MEANS IN ACCORDANCE WITH A REPRODUCED SIGNAL

[75] Inventor: Toshiya Yatomi, Sagamihara, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/822,617

[22] Filed: Mar. 20, 1997

[30] Foreign Application Priority Data

Mar. 22, 1996 [JP] Japan .................................. 8-066553

[51] Int. Cl.[7] ...................................................... H04N 5/76
[52] U.S. Cl. ............................................. 386/46; 386/95
[58] Field of Search .................................. 386/46, 83, 95, 386/96, 52, 63, 65, 121, 77; 360/32, 48, 132; H04N 5/76

[56] References Cited

U.S. PATENT DOCUMENTS

| 5,727,060 | 3/1998 | Young ........................................ 386/83 |
| 5,786,955 | 7/1998 | Kori et al. .............................. 386/121 |
| 5,926,607 | 7/1999 | Orguro et al. ............................. 386/83 |
| 5,943,468 | 8/1999 | Takayama ................................. 386/94 |

*Primary Examiner*—Huy Nguyen
*Attorney, Agent, or Firm*—Fitzpatrick, Cella, Harper & Scinto

[57] ABSTRACT

There is disclosed an apparatus for recording or reproducing a signal on or from a cassette having a magnetic tape and a memory. In accordance with a signal which includes a first signal recorded by a first VTR compatible with the memory and a second signal recorded by a second VTR incompatible with the memory and is reproduced from the magnetic tape, the apparatus detects the area of the magnetic tape in which the second signal is recorded, and modifies data stored in the memory in accordance with the detection result.

24 Claims, 10 Drawing Sheets

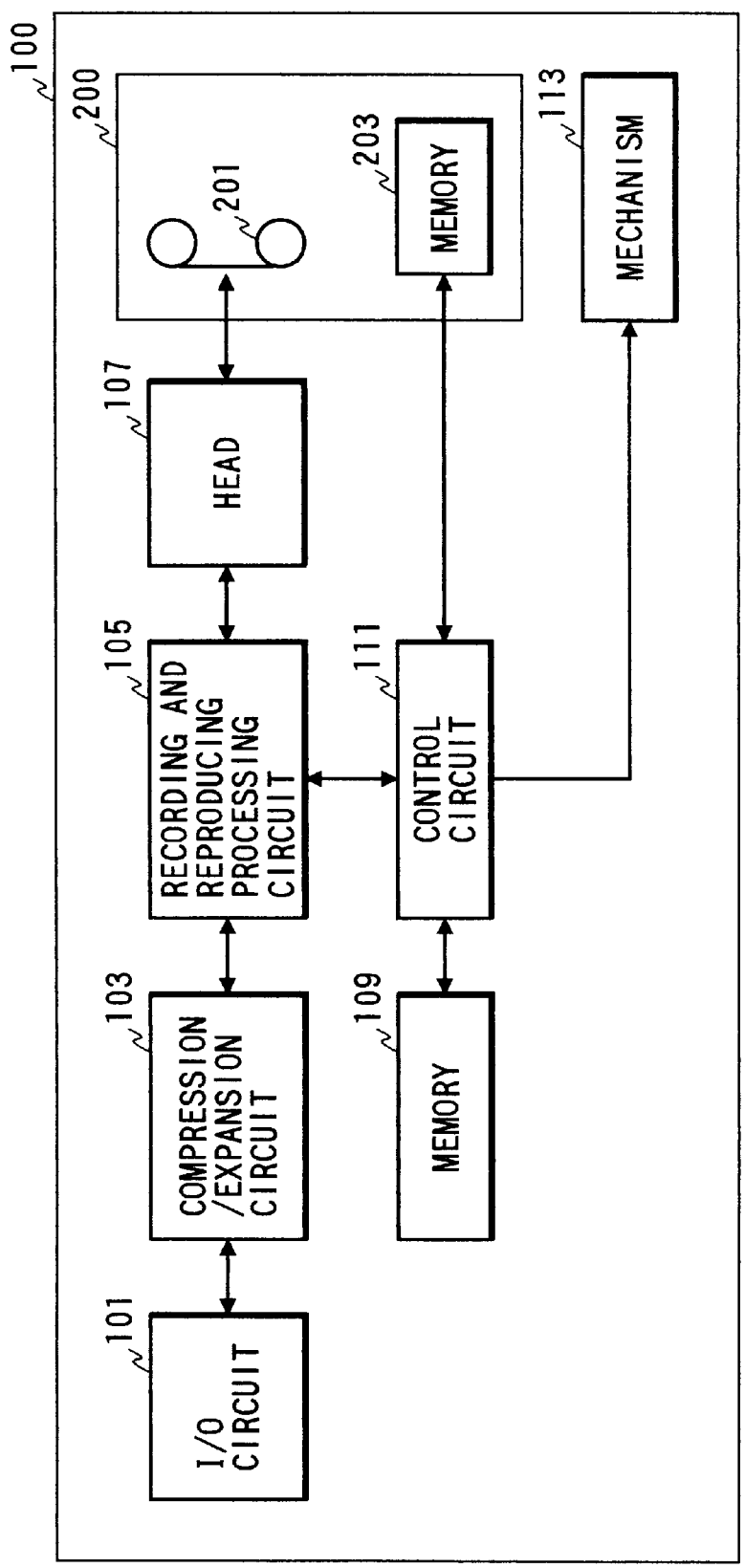

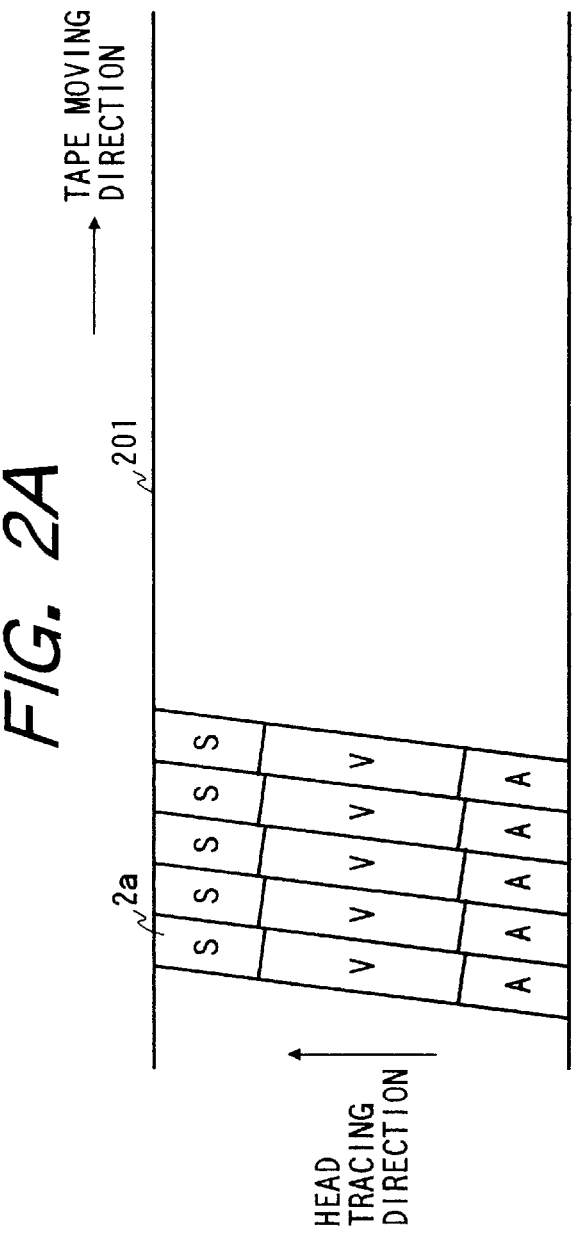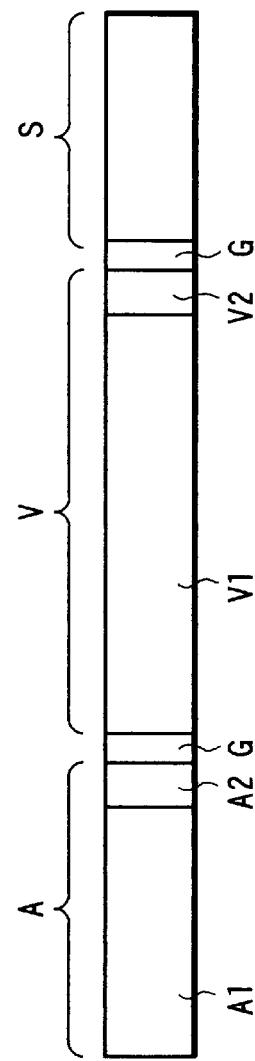

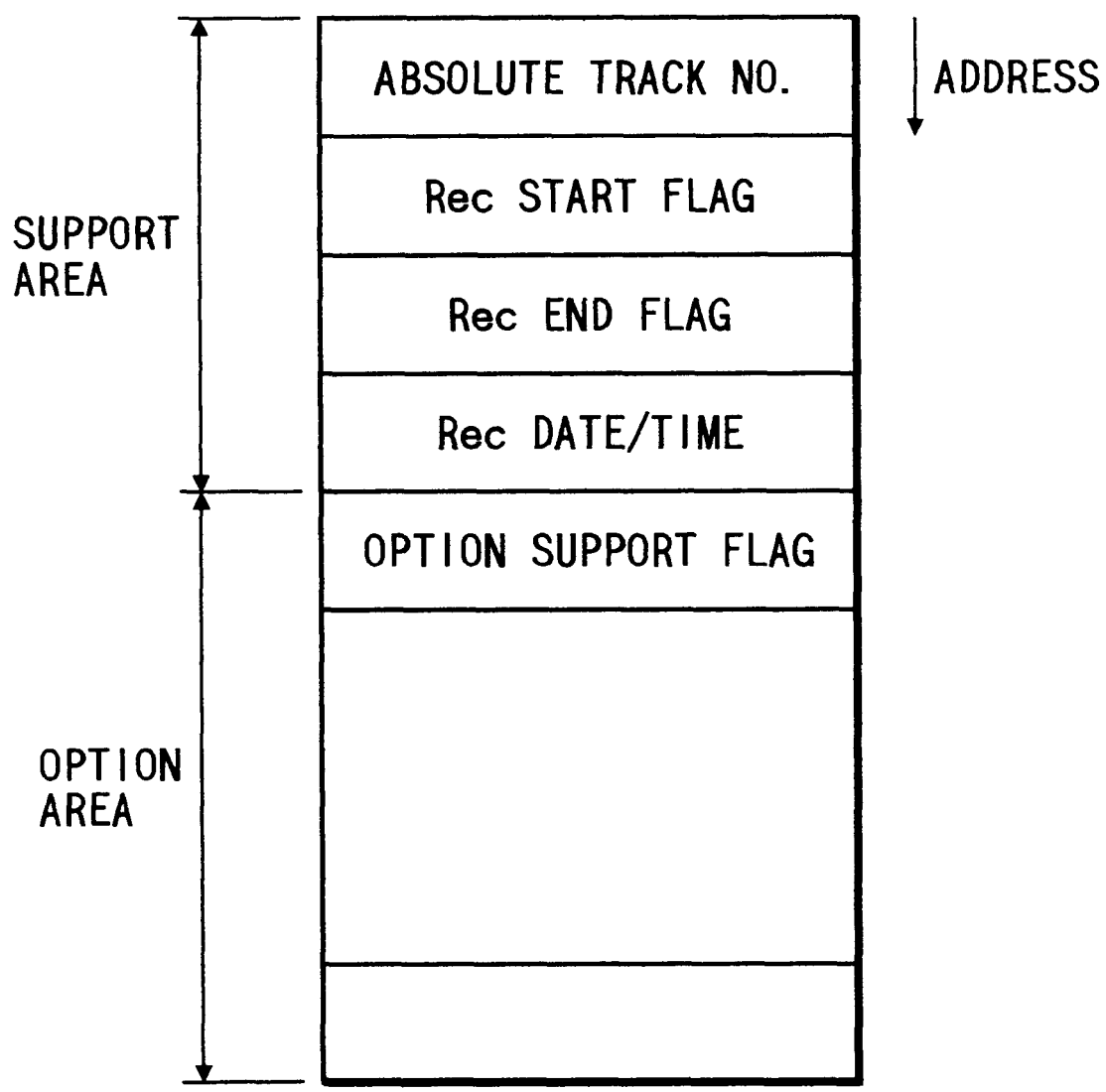

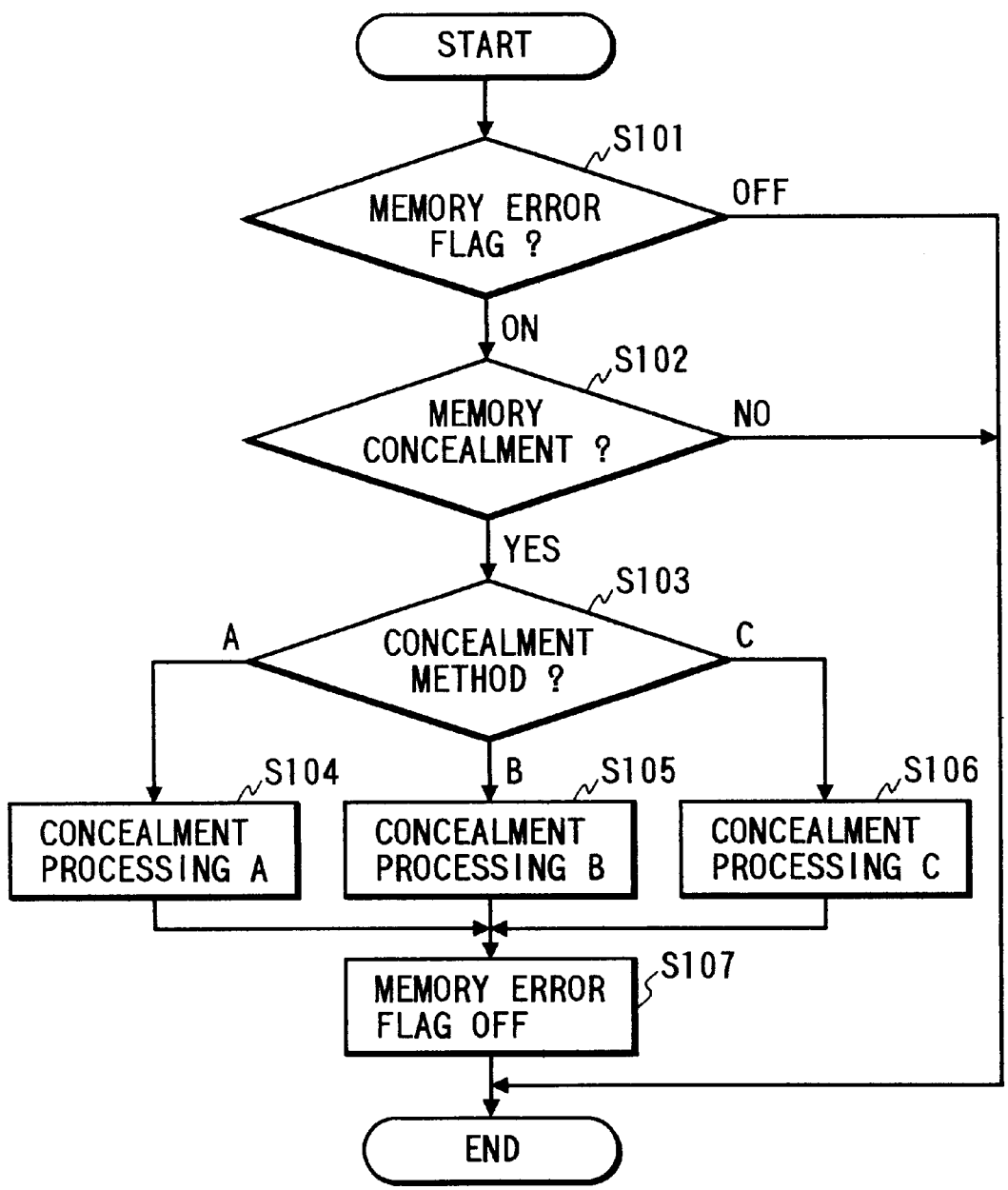

FIG. 8A

|  | Rec START TRACK NO. | Rec MODE |
|---|---|---|
| RECORDING (1) | 100 | V, A, S |
| RECORDING (2) | 150 | V, S |
| RECORDING (3) | 180 | V, A, S |
| RECORDING (4) | 210 | V, A, S |
| UNRECORDED |  |  |

FIG. 8B

|  | Rec START TRACK NO. | Rec MODE |
|---|---|---|
| RECORDING (1) | 100 | V, A, S |
| RECORDING (2) | 150 | V, S |
| UNRECORDED |  |  |

FIG. 10

|  | Rec START TRACK NO. | Rec MODE |
|---|---|---|
| RECORDING (3) | 180 | V, A |
| RECORDING (4) | 210 | V, A |

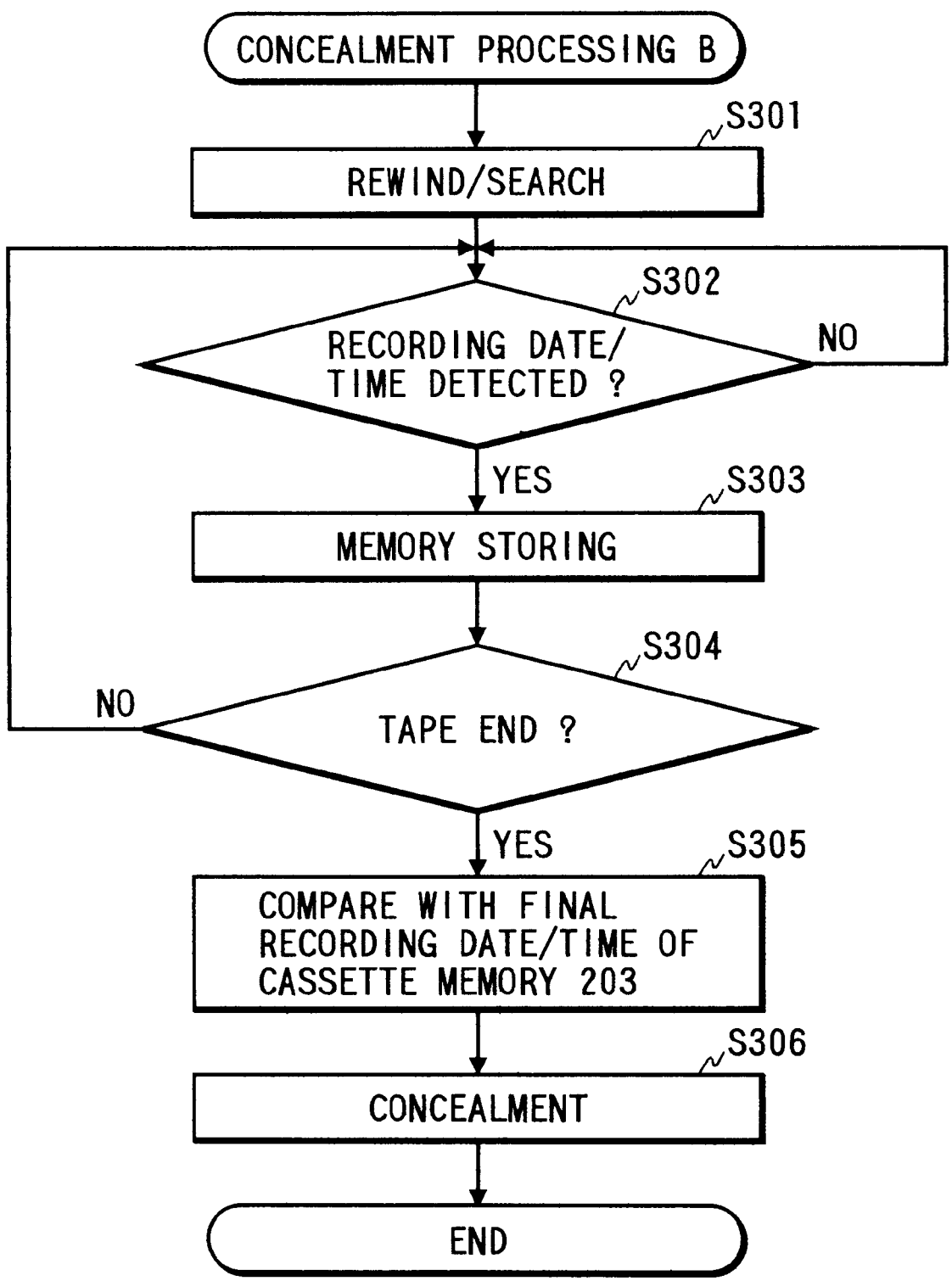

MODIFYING DATA STORED IN MEMORY MEANS IN ACCORDANCE WITH A REPRODUCED SIGNAL

BACKGROUND OF THE INVENTION

1. Field of the Invention

The present invention relates to a recording apparatus and, more particularly, to an apparatus for recording data on a memory device integrating a recording medium and a memory.

2. Description of the Related Art

As an apparatus of this type, a digital VTR which records digital image and audio signals on a magnetic tape is known. In recent years, in digital VTRs for the consumer use, a technique of recording data for a tape cassette provided with a cassette memory comprising a semiconductor memory arranged outside a magnetic tape has been proposed. The tape cassette with the cassette memory has I/O terminals used for reading/writing data from/to the cassette memory. As the purpose of use of such cassette memory, various kinds of information associated with data recorded on a tape inside a cassette on which the cassette memory is arranged, such as a recording start point, recording end point, recording date, and the like, may be written in the cassette memory.

On the other hand, since such cassette memory is expensive, a tape cassette without any cassette memory is also available. As a result, both VTRs which allow both read/write accesses to the cassette memory (to be referred to as compatible VTRs hereinafter) and VTRs which cannot make read/write accesses to the cassette memory (to be referred to as incompatible VTRs hereinafter) are expected to be present on the market.

When a given cassette having the above-mentioned cassette memory is used in both the compatible and incompatible VTRs, various kinds of information associated with recording by the compatible VTR alone are stored in the cassette memory, but no information associated with recording by the incompatible VTR is recorded, as a matter of course. Accordingly, even when the operation control, e.g., a program search of a tape, is performed on the basis of information stored in the cassette memory, the VTR may cause operation errors. For example, when the first recording is performed using the compatible VTR and the recording end point is stored in the cassette memory, and thereafter, the second recording is performed using the incompatible VTR, the second recording end point is not stored in the cassette memory. Hence, upon executing the third recording, if a program search is made using the first recording end point stored in the cassette memory and the third recording is started from the found first recording end point, the contents of the second recording are erased.

In view of this problem, the operation control of the VTR according to the data stored in the cassette memory may be inhibited. However, in this case, the cassette memory cannot be effectively used.

SUMMARY OF THE INVENTION

It is an object of the present invention to solve the above-mentioned problems.

It is another object of the present invention to effectively utilize a memory.

It is still another object of the present invention to prevent operation errors of the apparatus even when an apparatus which is incompatible with the memory records or reproduces data to or from a recording medium.

In order to achieve the above objects, according to one aspect of the present invention, there is provided an apparatus for reproducing a signal from a storage device which integrally comprises a storage medium and memory means, comprising:

reproducing means for reproducing a signal from the storage medium;

detection means for detecting a recorded position of a predetermined signal on the storage medium in accordance with the signal reproduced by the reproducing means; and modify means for modifying data stored in the memory means in accordance with a detection result of the detection means.

The above and other objects and features of the present invention will become apparent from the detailed description of the embodiments taken in conjunction with the accompanying drawings.

BRIEF DESCRIPTION OF THE DRAWINGS

FIG. 1 is a block diagram showing the arrangement of a digital VTR according to an embodiment of the present invention;

FIGS. 2A and 2B show the recording format of the VTR shown in FIG. 1;

FIG. 3 shows the format of support data recorded on a tape by the VTR shown in FIG. 1;

FIG. 5 is a flow chart showing the operation of the embodiment of the present invention;

FIGS. 8A and 8B show tables generated in the concealment processing shown in FIG. 7;

FIG. 9 is a flow chart showing concealment processing B shown in FIG. 5;

FIG. 10 shows a table generated in the concealment processing shown in FIG. 9.

DETAILED DESCRIPTION OF THE PREFERRED EMBODIMENTS

Figure 4:
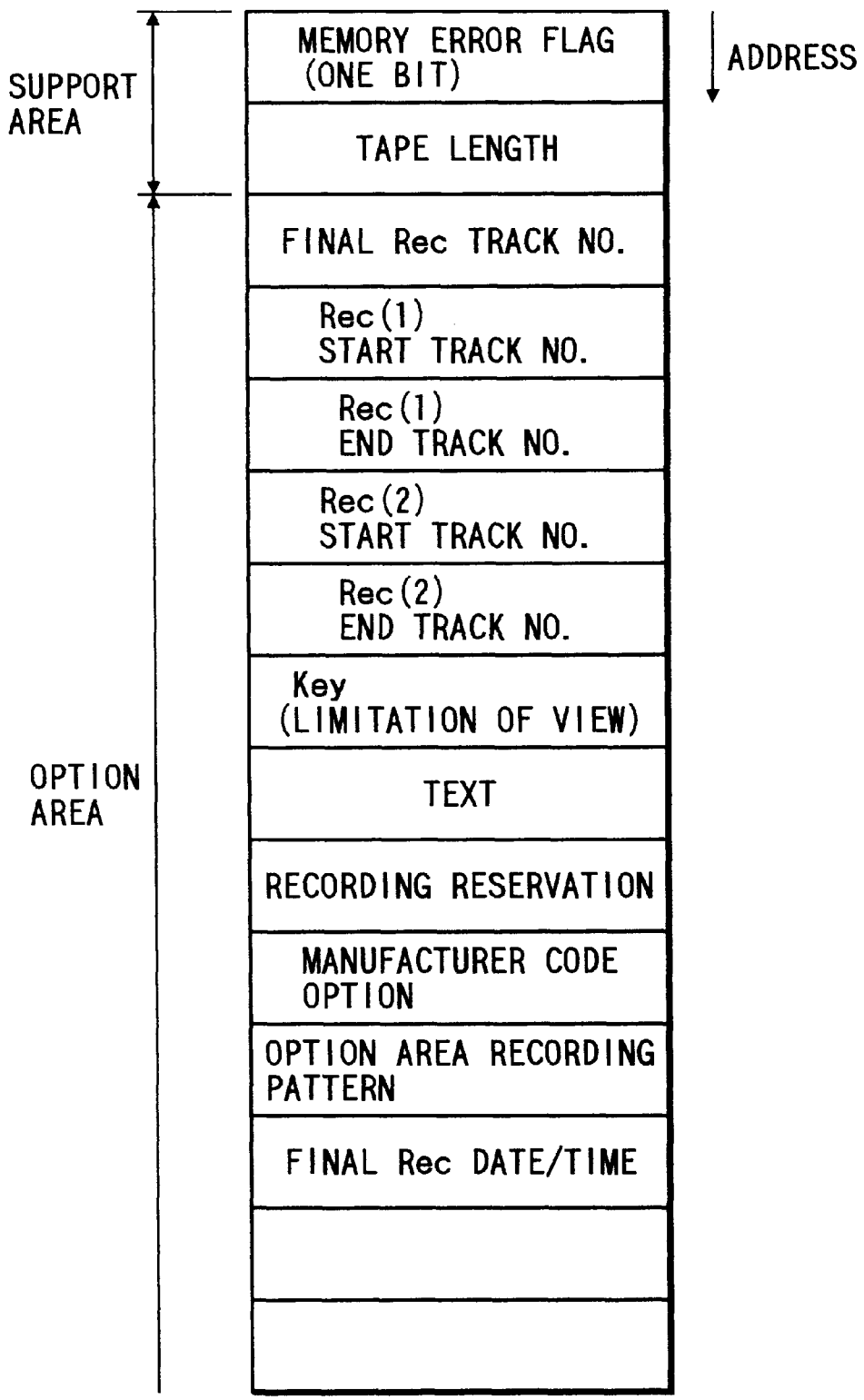
FIG. 4 shows the format of data recorded on a cassette memory shown in FIG. 1.

The preferred embodiment of the present invention will be described in detail hereinafter with reference to the accompanying drawings.

FIG. 1 is a block diagram showing the arrangement of a digital VTR to which the present invention is applied.

The VTR shown in FIG. 1 is one compatible with a cassette memory of the above-mentioned two types of VTRs.

FIG. 1 illustrates a digital VTR 100 and a cassette 200.

A normal recording/reproduction operation will be explained below.

Upon data recording, an I/O circuit 101 receives an analog video signal and audio signal from a device outside the VTR, converts them into digital signals, and outputs the digital signals to a compression/expansion circuit 103. The compression/expansion circuit 103 compresses the information volume of the input digital video signal using known DCT, quantization and variable length coding. Also, the circuit 103 compresses the information volume of the input digital audio signal using known DPCM.

A recording and reproducing processing circuit 105 re-arranges the digital video and audio signals output from the compression/expansion circuit 103 in accordance with predetermined recording formats, adds support data, ID data, and synchronization signals output from a control circuit 111 to the digital video and audio signals, and also re-arranges sub-code data in accordance with the recording formats.

The circuit 105 performs error correction coding of these data by adding parity data thereto, and also performs digital modulation processing of these data suitable for magnetic recording. Then, the circuit 105 outputs the data to a head 107.

The head 107 forms a large number of helical tracks on a tape 201 in the cassette 200, and records the video and audio signals and sub-code data in the predetermined recording format.

FIGS. 2A and 2B show the recording format of the individual data on the tape 201.

As shown in FIG. 2A, a large number of helical tracks 2a are formed on the tape 201. On each track 2a, areas A, V, and S in the tracing order of the head are respectively audio signal, video signal, and sub-code recording areas.

FIG. 2B shows the recording format on each track 2a shown in FIG. 2A.

The recording area A consists of an area A1 for recording a digital audio signal and an area A2 for recording support data associated with the digital audio signal.

The recording area V consists of an area V1 for recording a digital video signal and an area V2 for recording support data associated with the digital video signal.

Upon data reproduction, data reproduced from the tracks 2a on the tape 201 by the head 107 are output to the recording and reproducing processing circuit 105, and are subjected to demodulation processing corresponding to the processing upon recording.

Furthermore, errors are corrected using the parity data added upon recording, and the video and audio signals are output to the compression/expansion circuit 103. On the other hand, the sub-code data are output to the control circuit 111.

The compression/expansion circuit 103 expands the information volumes of the digital video and audio signals reproduced by the method corresponding to that in the recording mode, and outputs the expanded signals to the I/O circuit 101. The I/O circuit 101 converts the digital video and audio signals into analog signals, and outputs the analog signals.

The control circuit 111 generates various support data, ID data, sub-code data, and the like in accordance with recording of the video and audio signals, and outputs them to the recording and reproducing processing circuit 105. Also, the control circuit 111 controls the individual units of the VTR in accordance with the reproduced support data and sub-code data.

Furthermore, the control circuit 111 reads/writes data from/to a cassette memory 203.

Reading/writing data with respect to the cassette memory 203 will be explained below.

When the cassette 200 is set in the VTR 100 or the power switch of the VTR 100 is turned on, the control circuit 111 reads out data from the cassette memory 203 comprising a semiconductor memory, and writes them in a memory 109.

The control circuit 111 generates data to be written in the cassette memory 203 in accordance with recording and reproducing of the VTR, and writes them in the memory 109.

When the cassette 200 is ejected or the power switch of the VTR 100 is turned off, the control circuit 111 writes the data stored in the memory 109 in the cassette memory 203.

These support data and data to be stored in the cassette memory 203 will be explained below.

FIG. 3 shows the format of the support data for the video and audio signals and sub-code data.

Support data is divided into a support area and an option area. The support area is an area supported by both the compatible and incompatible VTRs, and records a track No. indicating the absolute position of each tracks 2a from the beginning of the tape, a Rec start flag indicating the recording start point, a Rec end flag indicating the recording end point, and a Rec date/time data indicating the recording date.

The option support area records an option support flag indicating whether or not the corresponding cassette is subjected to recording or reproduction in the compatible VTR at the first address, and can record free data at subsequent addresses.

Note that each data shown in FIG. 3 has an architecture called a pack.

More specifically, each pack consists of a total of 5 bytes, i.e., a 1-byte pack header indicating the type of data recorded in the pack, and 4-byte data of the pack.

FIG. 4 shows the format of data to be written in the cassette memory 203.

The cassette memory 203 is allocated with a support area supported by both the compatible and incompatible VTRs, and an option area which is free to support.

More specifically, the support area consists of a 1-bit memory error flag indicating that the corresponding cassette was subjected to recording or reproduction by the incompatible VTR, and tape length data indicating the recordable time of the tape 201, and the memory error flag can be rewritten by even the incompatible VTR. More specifically, when the incompatible VTR performs recording or reproduction with respect to the cassette with the cassette memory 203, it rewrites the memory error flag to data "1" indicating that the corresponding cassette was subjected to recording or reproduction by the incompatible VTR.

In this embodiment, the option area records a final Rec track No. indicating the final track number of the recorded tracks on the tape 201, Rec (1) start and end track Nos. indicating the track numbers at the first recording start and end points, and Rec (2) start and end track Nos. indicating the track numbers at the second recording start and end points.

In this embodiment, in addition to the above-mentioned data, the option area records Key data for limiting viewing of a specific recorded program, TEXT data associated with the contents of recorded data (e.g., the director's name of a movie), recording reservation code option data for recording reservation, manufacturer code option data indicating unique functions of the manufacturer, option area recording pattern data indicating one, to be used, of three processing functions A, B, and C (to be described later), final recording date/time data indicating the final recording date of the tape 201, and the like. Each data show in FIG. 4 also has the pack architecture described above.

The operation for concealing the data in the cassette memory 203 in the cassette 200 with a history of recording or reproduction by the incompatible VTR to match the contents of the data currently recorded on the tape 201 of the cassette will be described below with reference to the flow chart shown in FIG. 5.

As described above, when the cassette 200 is set in the compatible VTR, the control circuit 111 reads out data from the cassette memory 203 and writes them in the memory 109. Also, the control circuit 111 checks the memory error flag. If this flag is ON, i.e., "1", the control circuit 111 determines that the cassette 200 of interest was subjected to recording or reproduction by the incompatible VTR (step S101). Accordingly, the data recorded in the option area are those associated with recording or reproduction by the compatible VTR alone.

Subsequently, a message indicating whether or not the user makes concealment is displayed using a display circuit (not shown). If the user wants to perform concealment, he or she inputs a message indicating this using an operation unit (not shown) (step S102). The control circuit 111 then checks based on option area recording pattern data recorded in the option area shown in FIG. 4 which of concealment processing functions A, B, and C is to be executed (step S103). The control circuit 111 performs the concealment processing in one of steps S104, S105, and S106 in accordance with the checking result, and thereafter, sets the memory error flag to be OFF, i.e., "0", thus ending the processing.

The concealment processing functions A, B, and C will be explained below.

These processing functions use different detection methods of data recorded by the incompatible VTR of those recorded on the tape 201.

More specifically, in the concealment function A, the compatible VTR records Rec start track No. data in the option area in the cassette memory 203 shown in FIG. 4, and detects data recorded on the tape 201 by the incompatible VTR using the Rec start track No. data and a Rec start flag recorded on the tape 201, thereby concealing data in the cassette memory 203.

In the concealment processing B, the compatible VTR records final Rec date/time data in the option area, and detects data recorded on the tape 201 by the incompatible VTR using the final Rec date/time data and Rec date/time data recorded on the tape 201, thereby concealing data in the cassette memory 203.

On the other hand, in the concealment processing C, data recorded on the tape 201 by the incompatible VTR are detected on the basis of support data in the areas A and V and an option support flag in sub-code data on the tracks 2a on the tape 201 in FIG. 3, thereby concealing data in the cassette memory 203.

In the embodiment shown in FIG. 4, the Rec start track No. data and the final Rec date/time data are recorded, and either of these data may be recorded as option area recording pattern data. Normally, if either of these data is recorded as the option area recording pattern data, data in the cassette memory 203 can be corrected.

The concealment processing A will be described below.

Figure 6A:
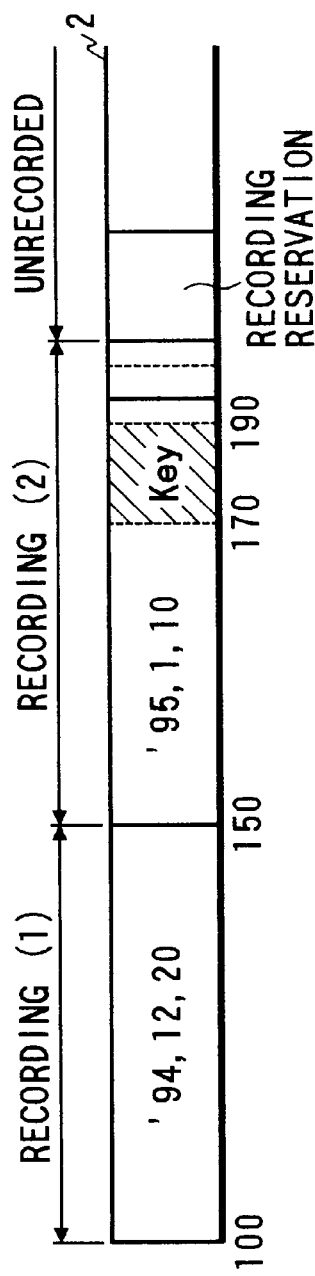
FIGS. 6A and 6B are charts showing an example of the recorded contents of a tape.
Figure 6B:
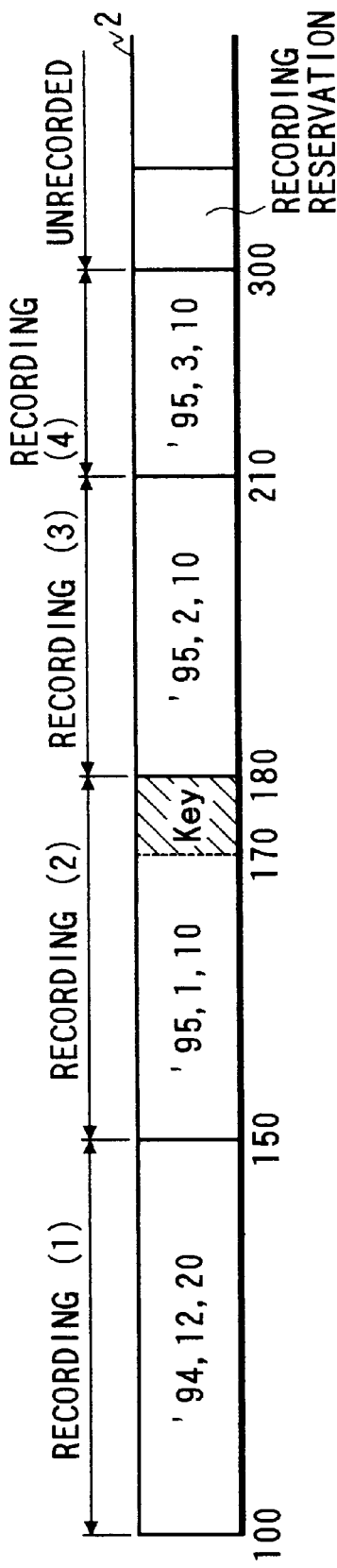

FIGS. 6A and 6B show an example of the recorded contents of data on the tape 201.

Referring to FIG. 6A, the compatible VTR records first and second recording data (1) and (2) on tracks from track Nos. 100 to 150 and tracks from track Nos. 151 to 190 at the dates shown in FIG. 6A, respectively. At this time, Key data, i.e, limitation of viewing, is set for an area from track Nos. 170 to 190. Thereafter, TEXT data and recording reservation data are recorded.

On this tape 201, the incompatible VTR records third and fourth recording data (3) and (4) on tracks from track Nos. 180 to 210 and tracks from track Nos. 211 to 300, as shown in FIG. 6B. As a result, a portion of the area set with the Key data and the TEXT data shown in FIG. 6A are erased by overrecording.

In this case, since the third recording was made in accordance with the recording reservation data, the next recording reservation data is recorded on an unrecorded area after the fourth recording data (4).

As a result of such recording, data in the cassette memory 203 in the cassette 200 that houses the tape 201 in the state shown in FIG. 6B are associated with only the recording data (1) and (2). Therefore, the data in the cassette memory 203 must be rewritten to match the recorded contents of the tape 201 shown in FIG. 6B.

The concealment processing A will be described below with reference to the flow chart in FIG. 7.

Figure 7:
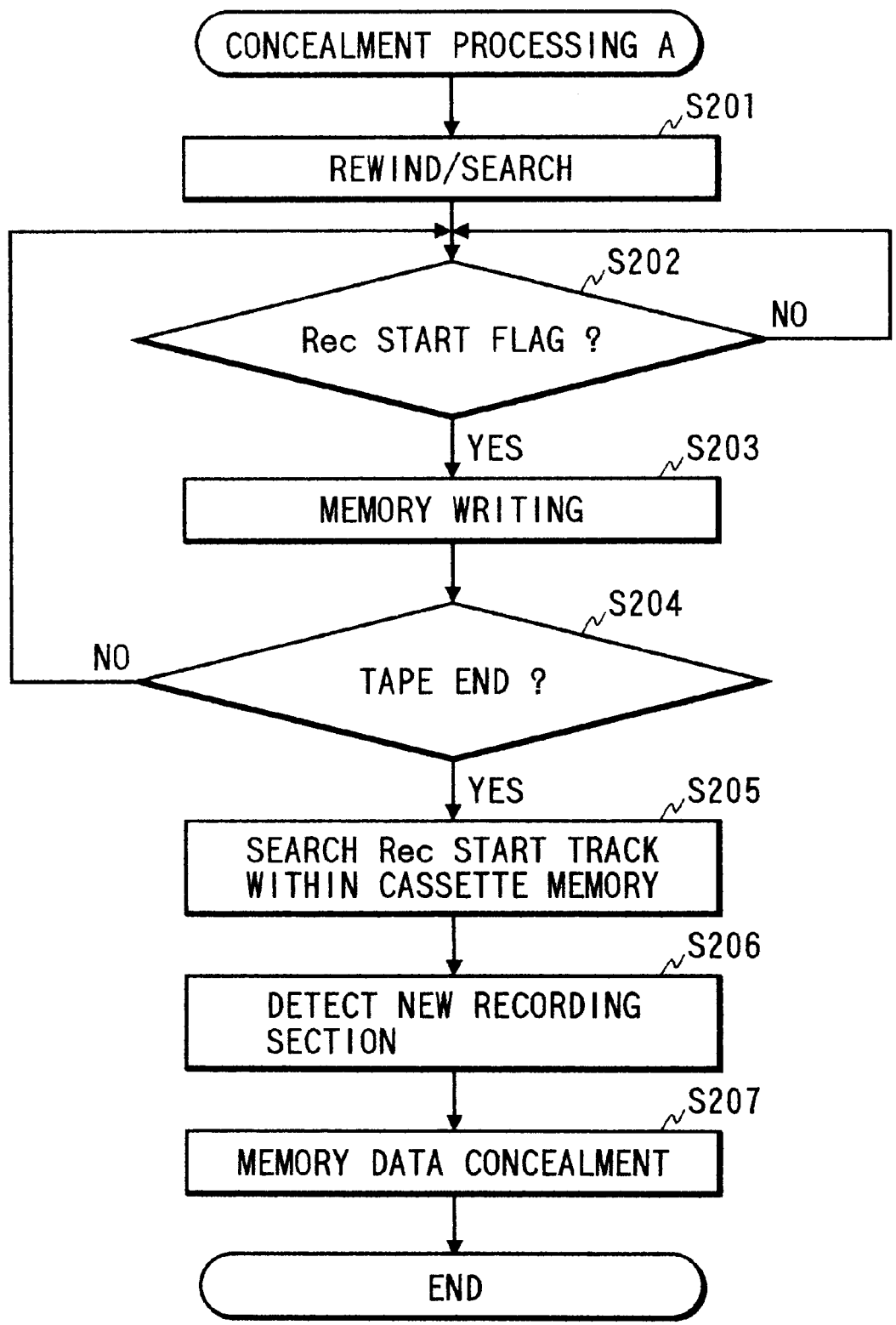
FIG. 7 is a flow chart showing concealment processing A shown in FIG. 5.

FIG. 7 is a flow chart for explaining the operation of the control circuit 111 in the concealment processing A.

Referring to FIG. 7, when the concealment processing A is set, the control circuit 111 controls a mechanism 113 to rewind the tape 201 to its start end, and to then feed the tape 201 at high speed (step S201). The control circuit 111 detects a Rec start flag from support data recorded on the areas A and V and sub-code data recorded on the areas S on the tape 201 (step S202), extracts track No. data of the track on which the Rec start flag is recorded from the sub-code data, and writes it in the memory 109 (step S203). The control circuit 111 repeats this processing to the tape end (step S204).

In this embodiment, a Rec start flag is detected from each of the areas A, V, and S on each track, since audio and video signals, and sub-code data can be independently recorded.

That is, an audio signal is recorded but no video signal is recorded, or vice versa.

In this manner, all the Rec start flags on the tape 201 are stored in the memory 109 to form a Rec start point table shown in FIG. 8A. Subsequently, the control circuit 111 searches data stored in the option area on the cassette memory 203, which data have already stored in the memory 109 in step S101 in FIG. 5 (step S205), for Rec start track Nos., and forms a Rec point table shown in FIG. 8B.

The control circuit 111 compares the Rec start point table shown in FIG. 8A and the Rec point table shown in FIG. 8B to detect an area recorded by the incompatible VTR among those on the tape 201 (step S206).

Thereafter, the control circuit 111 detects data associated with a new recording area among those stored in the cassette memory 203 shown in FIG. 4, and performs concealment and deletion of data on the memory 109.

In this embodiment, as described above, when the incompatible VTR performs recording on the tape 201, a portion of the effective period of the Key data is erased by the recording data (3), and the Key area end track No. of the Key data in the option area on the cassette memory 203 is updated to the No. immediately before the Rec start track No. of the recording data (3), i.e., to 179 in this embodiment.

Also, since the entire recording area of the TEXT data is rewritten by the recording data (3), the TEXT data in the option area on the cassette memory 203 is deleted. Since the contents and recording position of the recording reservation data have changed, the contents and the Rec start track No. of the recording reservation data are changed.

Furthermore, the Rec start and end track Nos. of the recording data (3) and (4) recorded by the incompatible VTR are respectively added as Rec start and end track No. data.

In this manner, in the concealment processing A, since data recorded on the tape 201 by the incompatible VTR are detected using the Rec start track No. data recorded in the cassette memory 203 and the Rec start flags recorded on the tape 201, the data recorded on the tape 201 by the incompatible VTR can be relatively easily detected.

Since the data in the cassette memory 203 are concealed on the basis of the detection result, even when recording is made by the incompatible VTR, the contents of data recorded on the tape can be matched with those of data recorded in the cassette memory.

Also, in the concealment processing A, information of the recording start position for each program required for editing can be obtained at the same time.

The concealment processing B will be explained below.

FIG. 9 is a flow chart for explaining the operation of the control circuit 111 in the concealment processing B.

Referring to FIG. 9, when the concealment processing B is executed, the control circuit 111 controls the mechanism 113 to rewind the tape 201 to its start end, and to then feed the tape 201 at high speed (step S301). The control circuit 111 detects Rec date/time data from support data recorded on the areas A and V and sub-code data recorded on the areas S on the tape 201 (step S302), and stores the detected recording date/time data in the memory 109. Also, the control circuit 111 reads the Rec start track No. of a program corresponding to the detected recording date/time data, and stores it in the memory 109 (step S303). The control circuit 111 repeats this processing to the tape end (step S304).

Subsequently, the control circuit 111 compares the final recording date/time data in the cassette memory 203 and the recording date/time data of each program detected from the tape 201, as described above. Then, the control circuit 111 detects programs recorded after the final recording date/time data in the cassette memory 203 and their Rec start track Nos. and forms, on the memory 109, a table indicating the Rec start track Nos. of programs recorded after the final recording date/time data recorded in the cassette memory 203, as shown in FIG. 10 (step S305).

Thereafter, the control circuit 111 conceals data in the cassette memory 203 in the same manner as in the concealment processing A shown in FIG. 7 (step S306).

In this manner, in the concealment processing B, data recorded on the tape 201 by the incompatible VTR can be relatively easily detected using the final recording date/time data recorded in the cassette memory 203 and the recording date/time data recorded on the tape 201.

Since the data in the cassette memory 203 are concealed on the basis of the detection result, even when recording is made by the incompatible VTR, the contents of data recorded on the tape can be matched with those of data recorded in the cassette memory.

The concealment processing C will be described below.

Figure 11:
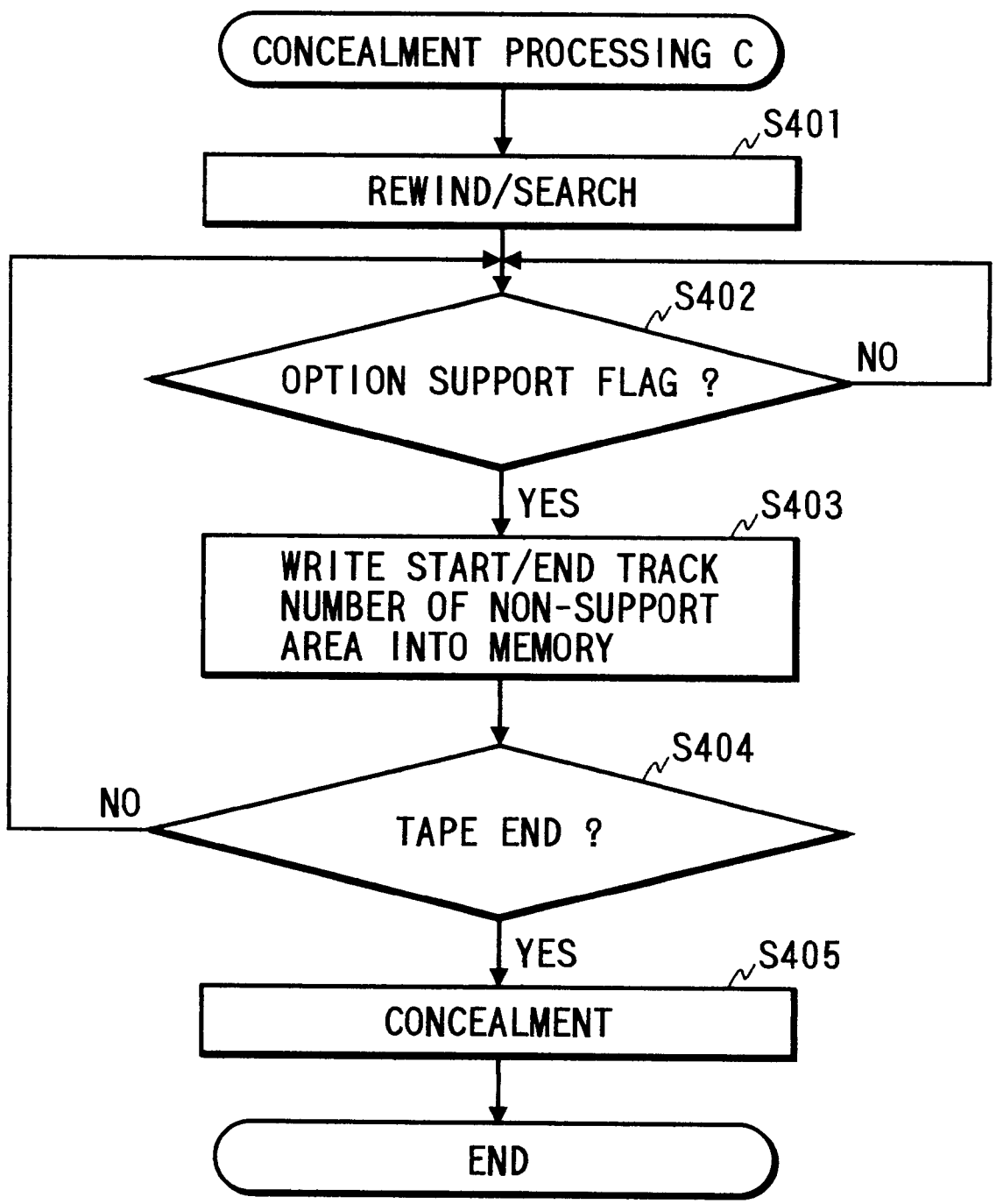
FIG. 11 is a flow chart showing concealment processing C shown in FIG. 5.

FIG. 11 is a flow chart showing the operation of the control circuit 111 in the concealment processing C.

Referring to FIG. 11, when the concealment processing C is set, the control circuit 111 controls the mechanism 113 to rewind the tape 201 to its start end, and to then feed the tape 201 at high speed (step S401). The control circuit 111 detects an option support flag from support data recorded on the areas A and V and sub-code data recorded on the areas S on the tape 201 (step S402) to detect an area with the option support flag=OFF, i.e., an area recorded by the incompatible VTR. Then, the control circuit 111 extracts the start and end track No. data of each area from the sub-code data and writes them in the memory 109 (step S403). The control circuit 111 repeats this processing to the tape end (step S404).

Thereafter, the control circuit 111 conceals the data in the cassette memory 203 in accordance with the track Nos. written in the memory and indicating areas recorded by the incompatible VTR in the same manner as in the concealment processing functions A and B described above (step S405).

In this manner, since the concealment processing C can detect an area recorded by the incompatible VTR by detecting only the option support flag recorded on the tape 201, even when neither the final Rec date/time data nor Rec start track No. data are recorded in the cassette memory 203, the area recorded on the tape 201 by the incompatible VTR can be detected.

Since the data in the cassette memory 203 are concealed on the basis of the detection result, even when recording is made by the incompatible VTR, the contents of data recorded on the tape can be matched with those of data recorded in the cassette memory.

As described above, in this embodiment, data in the cassette memory can be matched with the contents of data recorded on the tape by one of the concealment processing functions.

Accordingly, operation errors of the VTR according to data in the cassette memory can be prevented.

The cassette memory can be effectively used.

In the above-mentioned embodiment, the VTR that records/reproduces data on/from the cassette having the tape and the memory has been described. However, the present invention can also be applied to apparatus that record/reproduce data on/from storage devices which integrally comprise a plurality of types of storage media, and can provide the same effects.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for reproducing a signal from a storage devices, which integrally comprises a storage medium and memory means, said apparatus comprising:

reproducing means for reproducing an information signal from the storage medium;

reading means for reading data relating to the information signal stored in the storage medium and a memory error flag; and modifying means for discriminating whether data stored in the memory means corresponds to the information signal stored in the storage medium based on the read memory error flag, and for modifying the data stored in the memory means in accordance with a discrimination result and the information signal reproduced by said reproducing means.

2. An apparatus according to claim 1, wherein the information signal stored in the storage medium comprises a first signal recorded by a first apparatus, which can record the data in the memory means, and a second signal recorded by a second apparatus, which cannot record the data in the memory means.

3. An apparatus according to claim 2, wherein said modifying means comprises detection means for detecting a recording position of the second signal and modifies data stored in the memory means according to a result detected by said detecting means, and wherein said detecting means detects a position at which a second signal is in the storage medium according to the information signal reproduced by said reproducing means.

4. An apparatus according to claim 3, wherein
the information signal reproduced by said reproducing means comprises indication data indicating whether the information signal reproduced by said reproducing means is the first signal, and
the detection means detects the recording position of the second signal in accordance with the indication data.

5. An apparatus according to claim 1, wherein said modifying means comprises a memory for storing the data read out by said reading means, and modifies the data using the memory.

6. An apparatus according to claim 5, wherein said modifying means comprises writing means for writing the modified data in the memory means.

7. An apparatus according to claim 1, wherein said modifying means comprises detecting means for detecting a recording area of a predetermined signal in the information signal stored in the storage medium, and modifies data stored in the memory means according to a detection result of the detecting means.

8. An apparatus according to claim 1, wherein said modifying means modifies the data to match contents of the reproduced signal with contents of the data.

9. An apparatus according to claim 3, wherein the reproduced signal includes a video signal and an audio signal, and the detection means detects the recording position of the second signal for each of the video signal and the audio signal.

10. An apparatus according to claim 1, wherein the storage device comprises a cassette comprising a magnetic tape and a semiconductor memory.

11. An apparatus for processing a signal on or from a cassette that includes a magnetic tape and a memory, comprising:
a recording/reproducing circuit, wherein
the signal recorded on the magnetic tape includes a first signal recorded by a first VTR, which can record data in a predetermined area of the memory, and a second signal recorded by a second VTR, which cannot record data in the predetermined area of the memory,
an area of the magnetic tape in which the second signal is recorded is detected in accordance with a signal reproduced from the magnetic tape,
a memory error flag is used for discriminating whether the data stored in the memory corresponds to the signal recorded on the magnetic tape, and
data stored in the memory is modified in accordance with a detection result.

12. An apparatus for processing a signal stored in a storage device integrally provided with a first storage medium and a second storage medium of respective different kinds, said apparatus comprising:
first reading means for reading an image signal from the first storage medium;
second reading means for reading data relating to the image signal stored in the first storage medium and a memory error flag from the second storage medium; and
modifying means for discriminating whether data stored in the second storage medium corresponds to the image signal stored in the first storage medium based on the read memory error flag, and for modifying the data stored in the second storage medium in accordance with a discrimination result.

13. An apparatus according to claim 12, wherein said modifying means modifies the data stored in the second storage medium so that the data stored in the second storage medium is matched with the image signal stored in the first storage medium by using a signal read by said first reading means.

14. An apparatus according to claim 12, wherein said modifying means comprises writing means for writing the modified data into the second storage medium.

15. An apparatus according to claim 12, wherein the signal stored in the first storage medium comprises a video signal and an audio signal.

16. An apparatus for processing a signal using a first storage medium and a second storage medium that is different in kind from the first storage medium, said apparatus comprising:
first reading means for reading an information signal from the first storage medium;
second reading means for reading data relating to the information signal stored in the first storage medium and a memory error flag from the second storage medium; and
modifying means for discriminating whether the data stored in the second storage medium corresponds to the information signal stored in the first storage medium based on the read memory error flag, and for modifying the data read out from the second storage medium in accordance with a discrimination result.

17. An apparatus according to claim 16, wherein the first storage medium comprises a magnetic storage medium and the second storage medium comprises a semiconductor memory.

18. An apparatus according to claim 16, wherein the data stored in the second storage medium comprises positional data indicating a storing position of the information signal in the first storage medium.

19. An apparatus according to claim 16, wherein said first reading means reads out the information signal from the first storage medium according to the data read out from the second storage medium.

20. An apparatus according to claim 16, wherein said modifying means modifies the data stored in the second storage medium so that the data stored in the second storage medium is matched with the information signal stored in the first storage medium by using a signal read by said first reading means.

21. An apparatus according to claim 16, wherein the information signal stored in the first storage medium comprises an image signal and an audio signal.

22. A method of reproducing a signal from a storage device, which integrally comprises a storage medium and memory means, said method comprising the steps of:
reproducing an information signal from the storage medium;
reading data relating to the information signal stored in the storage medium and a memory error flag; and
discriminating whether data stored in the memory means corresponds to the information signal stored in the storage medium based on the read memory error flag, and modifying the data stored in the memory means in accordance with a discrimination result and the information signal reproduced in said reproducing step.

23. A method for processing a signal stored in a storage device integrally provided with a first storage medium and a second storage medium of respective different kinds, said method comprising:

- a first reading step of reading an image signal from the first storage medium;
- a second reading step of reading data relating to the image signal stored in the first storage medium and a memory error flag from the second storage medium; and
- a modifying step of discriminating whether data stored in the second storage medium corresponds to the image signal stored in the first storage medium based on the read memory error flag, and of modifying the data stored in the second storage medium in accordance with a discrimination result.

24. A method for processing a signal using a first storage medium and a second storage medium that is different in kind from the first storage medium, said method comprising:

- a first reading step of reading an information signal from the first storage medium;
- a second reading step of reading data relating to the information signal stored in the first storage medium and a memory error flag from the second storage medium; and
- a modifying step of discriminating whether the data stored in the second storage medium corresponds to the information signal stored in the first storage medium based on the read memory error flag, and of modifying the data read out from the second storage medium in accordance with a discrimination result.

* * * * *

UNITED STATES PATENT AND TRADEMARK OFFICE
CERTIFICATE OF CORRECTION

PATENT NO. : 6,141,481
DATED : October 31, 2000
INVENTOR(S) : Toshiya Yatomi

Page 1 of 1

It is certified that error appears in the above-identified patent and that said Letters Patent is hereby corrected as shown below:

Column 4
Line 66, "show" should read -- shown --.

Column 6
Line 45, "stored" should read -- been stored --.

Column 8
Line 47, "devices," should read -- device, --.

Column 9
Line 3, " and modifies data" should be deleted;
Lines 4 and 5 should be deleted; and
Line 6, "detects a position at which a second signal is" should be deleted.

Signed and Sealed this

Twenty-first Day of August, 2001

Attest:

*Nicholas P. Godici*

NICHOLAS P. GODICI
*Attesting Officer*   *Acting Director of the United States Patent and Trademark Office*